Figure 3:
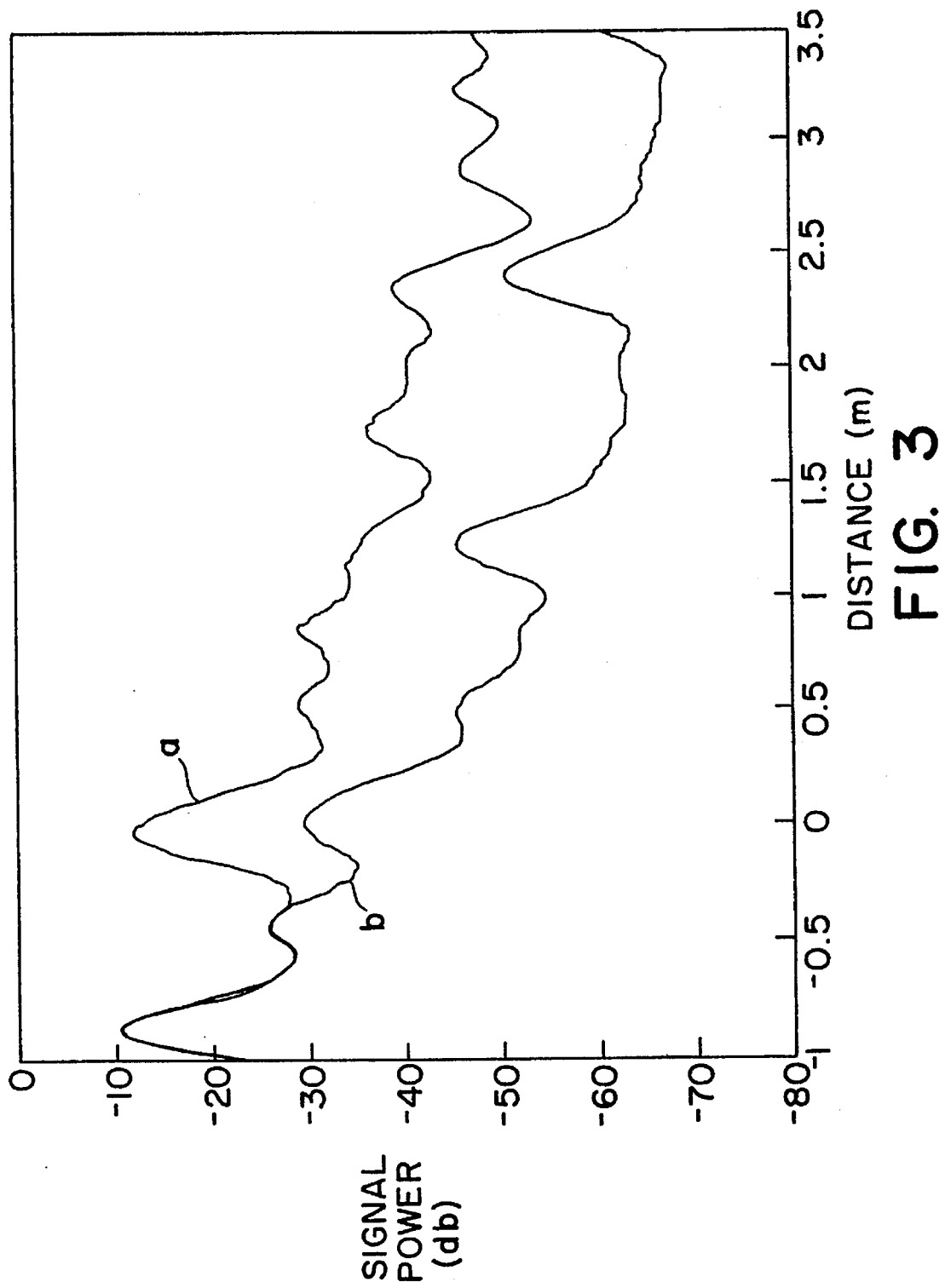

United States Patent [19]

Otto

[11] Patent Number: 5,594,449
[45] Date of Patent: Jan. 14, 1997

[54] TANK-CONTENTS LEVEL MEASURING ASSEMBLY

[75] Inventor: Johanngeorg Otto, Aalen-Hofherrnweiler, Germany

[73] Assignee: Endress + Hauser GmbH + Co., Maulburg, Germany

[21] Appl. No.: 464,614

[22] PCT Filed: Oct. 17, 1994

[86] PCT No.: PCT/DE94/01229

§ 371 Date: Jun. 20, 1995

§ 102(e) Date: Jun. 20, 1995

[87] PCT Pub. No.: WO95/12113

PCT Pub. Date: May 4, 1995

[30] Foreign Application Priority Data

Oct. 26, 1993 [DE] Germany .......................... 43 36 494.2

[51] Int. Cl.$^6$ .................................................. G01S 13/08
[52] U.S. Cl. ......................... 342/124; 340/612; 73/290 R
[58] Field of Search ............................ 342/124; 340/612; 73/290 R

[56] References Cited

U.S. PATENT DOCUMENTS

| 4,566,321 | 1/1986 | Zacchio ................................. 73/290 R |
| 4,670,754 | 6/1987 | Zacchio ................................. 342/124 |
| 5,115,218 | 5/1992 | Jean ........................................ 333/252 |
| 5,279,156 | 1/1994 | Van Der Pol ........................ 73/290 V |
| 5,351,036 | 9/1994 | Brown et al. ............................ 340/618 |
| 5,365,178 | 11/1994 | Van Der Pol ........................... 324/644 |

FOREIGN PATENT DOCUMENTS

WO93/01474  1/1993  WIPO .

Primary Examiner—J. Woodrow Eldred
Attorney, Agent, or Firm—Bose McKinney & Evans

[57] ABSTRACT

To measure the level of contents in metallic tanks by means of short electromagnetic waves, it is proposed to mount the complete level measuring assembly, including the horn antenna, outside the tank. The transmitted waves are projected through an opening in the tank wall toward the surface of the medium whose level is to be measured. The opening is closed with a glass or ceramic plate. To distinguish the useful signal within the unwanted echos caused by multiple reflections of the electromagnetic waves at the glass or ceramic plate, a damping layer of a conventional damping material is interposed between the microwave coupling element and the surface of the glass or ceramic plate. To achieve an optimum signal-to-noise ratio, the damping coefficient is fixable and the distance between the level measuring assembly and the surface of the glass or ceramic plate is adjustable in the axial direction of the opening.

13 Claims, 4 Drawing Sheets

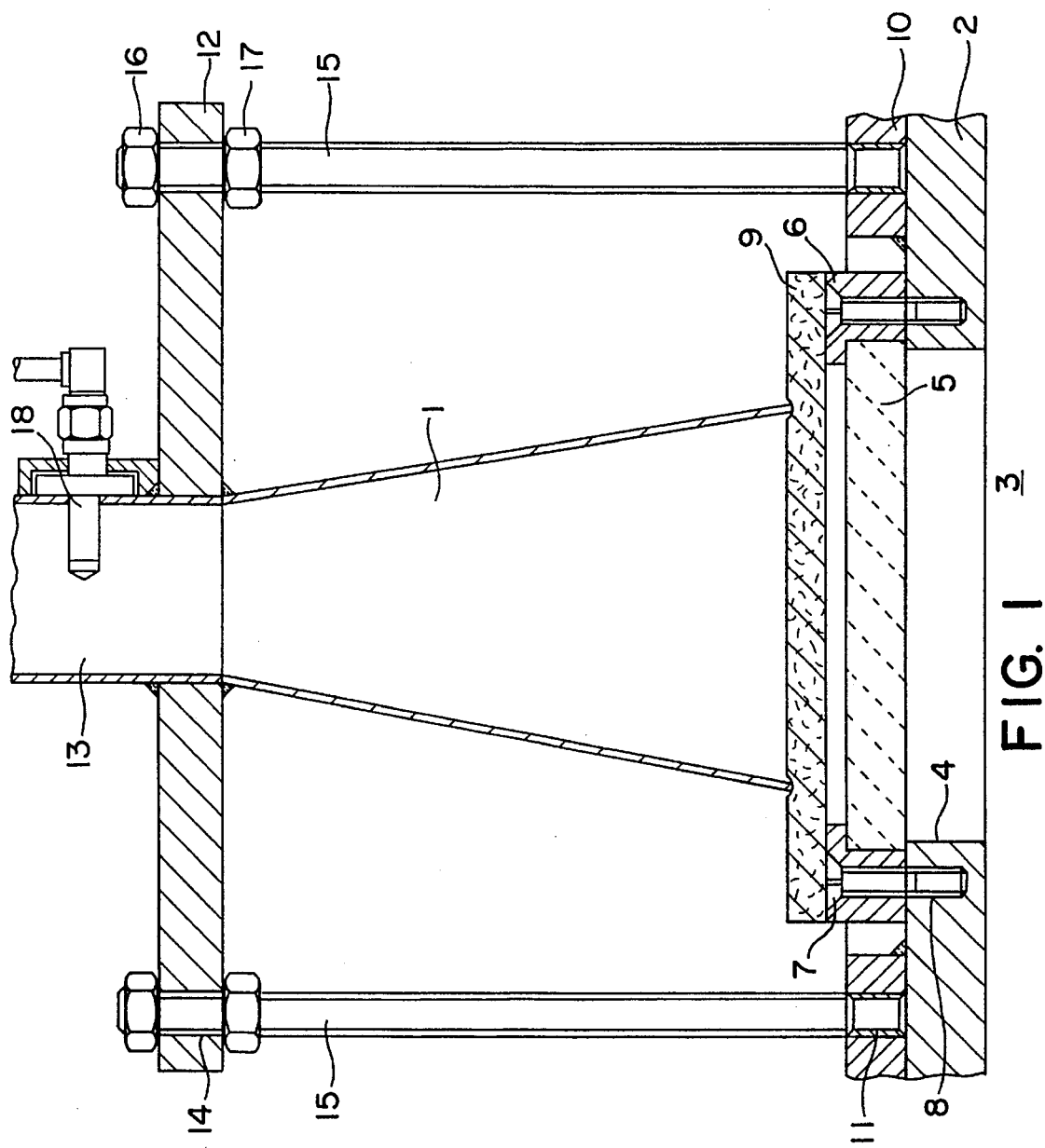
FIG. I

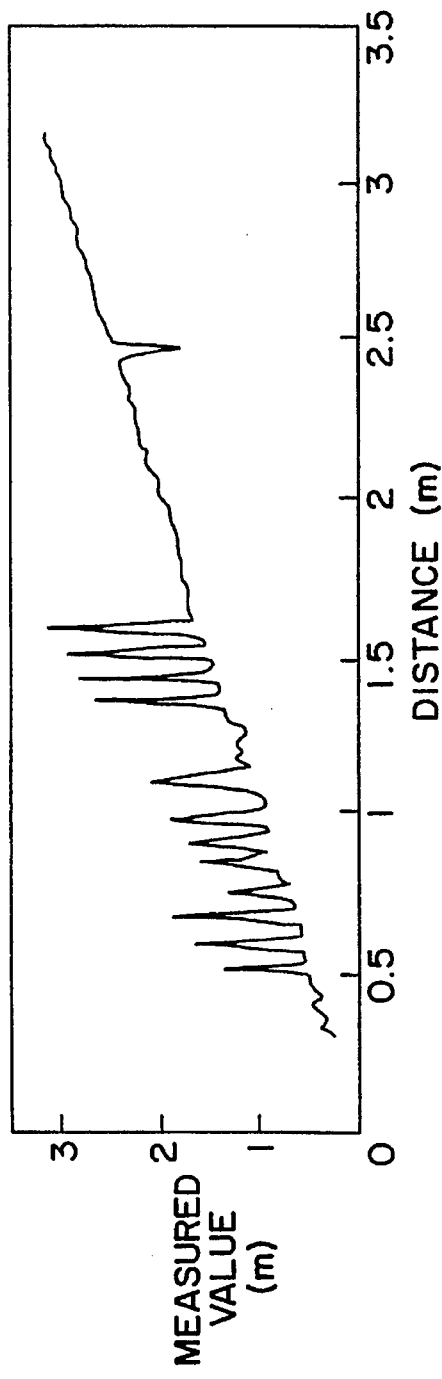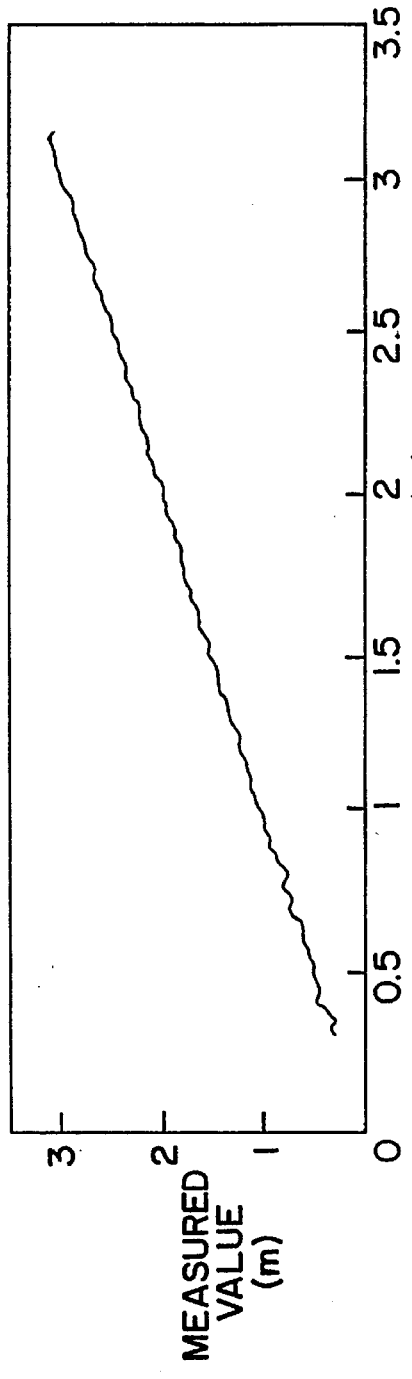

TANK-CONTENTS LEVEL MEASURING ASSEMBLY

The present invention relates to a tank-contents level measuring assembly comprising a horn antenna which transmits short electromagnetic waves, microwaves, through an opening in the tank toward the surface of contents of the tank, which electromagnetic waves are reflected at the surface and received by the same horn antenna. From the received echo waves, an echo function representing the echo amplitudes as a function of the distance is then formed for each measurement. The transit time of the microwave pulse is determined from this echo function, and the distance between the horn antenna and the surface of the tank contents is determined from this transit time.

various microwave tank-contents level measuring techniques are known which permit short distances to be measured by means of reflected waves. The most frequently used systems are pulse radar and frequency-modulated continuous-wave (FM-CW) radar. While in pulse radar, short microwave pulses are periodically radiated, their transit time is measured, and distance is determined therefrom, in FM-CW radar, a continuous microwave is transmitted which is periodically linearly frequency-modulated. The frequency of each received echo signal therefore differs from the frequency of the transmitted signal by an amount which depends on the transit time of the echo signal.

If such microwave level measuring assemblies are used in process control systems, such as in the chemical industry, exact measurements must be possible even under difficult measuring and ambient conditions. These difficult conditions are determined, for example, by high and/or constantly varying temperatures, high and/or varying pressures, and similar conditions, particularly by explosive or corrosive or toxic tank contents, i.e., media to be measured.

As is apparent from German Patent 41 00 922, these difficulties are obviated in the prior art by spatially separating the level measuring assembly so that the transmitting and receiving portion is located outside the dangerous interior of the tank and only the antenna is necessarily mounted inside the tank. The two parts are interconnected by a waveguide passed through the tank wall. To separate the transmitting and receiving portion from the interior of the tank, a waveguide window of quartz glass is disposed in the waveguide. The quartz glass is chosen to have a low dielectric loss factor, which is favorable to the transmission of the microwaves.

Such a separation of the measuring assembly, however, involves an increased amount of design complexity. In addition, matching devices of a material with a medium dielectric constant, such as Teflon, must be provided on both sides of the glass body, but this restricts the range of application, such as the temperature range and the chemical resistance. This increased complexity and the restrictions on the range of application would be avoidable if the complete level measuring assembly could be mounted outside the interior of the tank containing the explosive, corrosive, or toxic media to be measured. This, however, is possible only if the tank is made of a plastic material having a high transmission coefficient with respect to short electromagnetic waves, such as GFK, PVC, PD with $\epsilon_r < 7$.

Frequently, however, the tanks used in process engineering are of metal. Their metallic surfaces reflect electromagnetic waves, so that measurements through the closed tank wall are impossible.

The invention starts from the fact that such tanks very frequently have openings through which the interior of the tank has heretofore been visually monitored by operating personnel. These openings are so designed and so closed with a glass plate of suitable thickness that isolation in accordance with explosion protection regulations is provided between the interior of the tank and the ambient atmosphere, affording multiple safely. The problem could be solved by mounting the microwave level measuring assembly above such an inspection window so that the transmitted wave is directed through the window directly toward the surface of the tank contents.

However, mounting the complete microwave level measuring assembly outside the interior of the tank above such an inspection glass window entails such great disadvantages from a measurement point of view that so far, such a location of the level measuring assembly, which suggests itself, has not been chosen.

These disadvantages are that the wave impedance must be matched so that the inspection glass window passes microwaves within as large a band around the selected mid-frequency as possible. With the existing inspection glass windows, these requirements were not fulfilled or were fulfilled incompletely. Due to the considerable thicknesses of the glasses and the resulting abrupt change in wave impedance as well as the absence of suitable matching structures and their size, the transparence of such glass layers to microwaves was so low that no evaluatable signal was present.

It is the object of the invention to permit the level of contents in metallic tanks to be measured with the complete microwave level measuring assembly mounted outside the interior of the tank, namely above an existing or newly formed inspection glass window, and to avoid the metrological disadvantages which hitherto resulted from such a location of the assembly.

The invention further offers the advantage that by suitable choice of the spatial distance between the bottom edge of the horn antenna and the glass or ceramic plate, the signal-to-noise ratio and the signal strength of the electromagnetic waves are adjustable.

This object is attained by the features characterized in claim 1.

Figure 4:
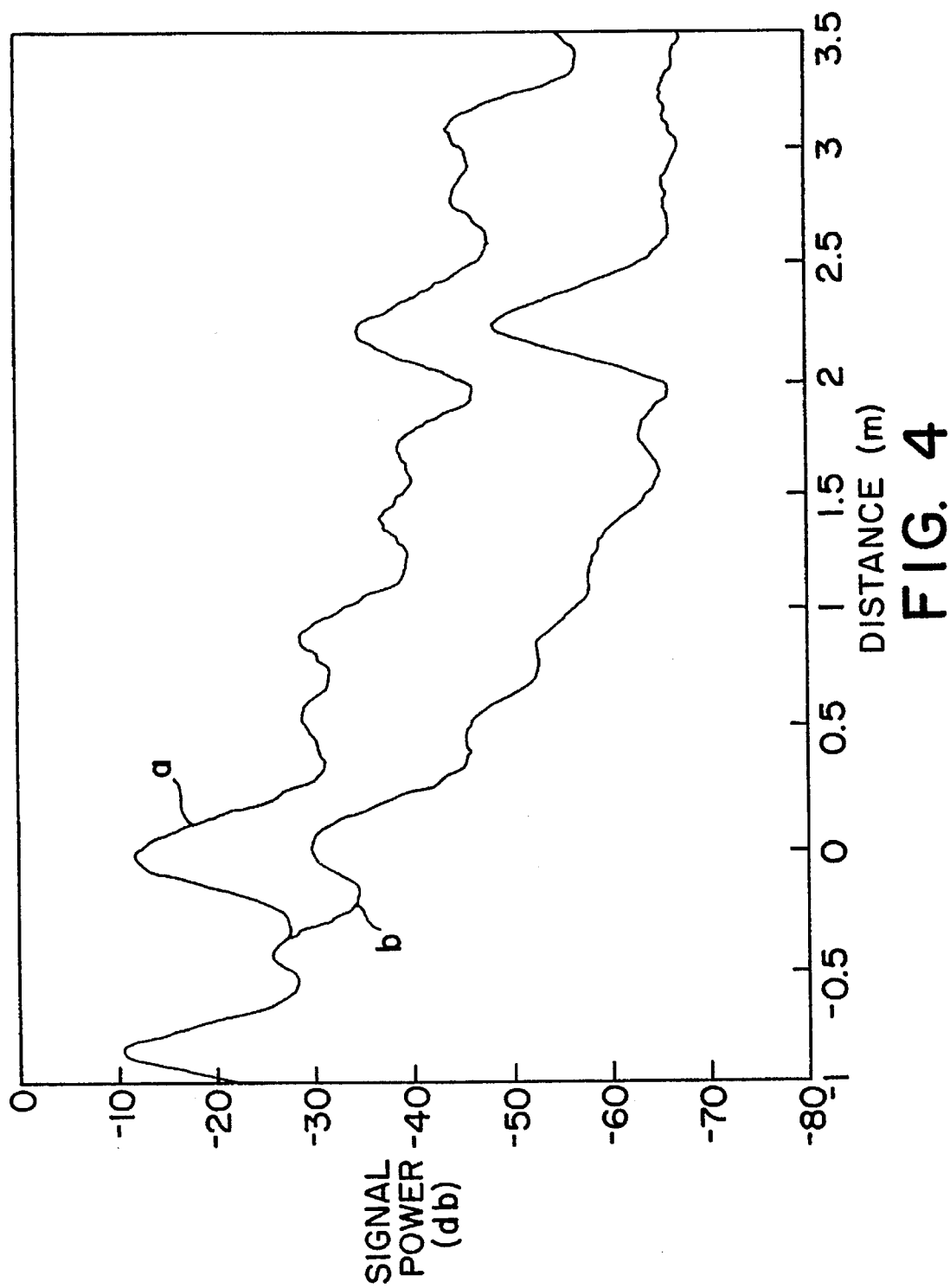

Further features and advantages of the invention will become apparent from the following description of an embodiment of the invention taken in conjunction with the accompanying drawings, in which:

FIG. 1 is a sectional view of the arrangement of a microwave level measuring assembly above an inspection glass window of a tank;

FIGS. 2a and b shows measured-value curves obtained with the microwave level measuring assembly without the use of the arrangement of FIG. 1 (graph a) and with the use of this arrangement (graph b);

FIG. 3 shows the echo function of the microwaves at a distance of 1.2 meters, again without the use of the arrangement of FIG. 1 (graph a) and with this arrangement (graph b), and FIG. 4 shows the echo function of the microwaves at a measuring distance of 2.2 meters without the use of the arrangement of FIG. 1 (graph a) and with the use of this arrangement (graph b).

In FIG. 1, the reference numeral 1 denotes the horn antenna of a compact microwave level measuring assembly. The microwave level measuring assembly is located outside a metallic tank, e.g., above a likewise metallic tank cover 2. The interior 3 of the tank contains the explosive or corrosive or toxic medium whose level is to be measured with the microwave level measuring assembly. As the metallic tank wall reflects electromagnetic waves, measurements directly through the tank wall are not possible. Therefore, the level measuring assembly is so disposed above a circular cylindrical opening 4 that the electromagnetic waves are projected via the horn antenna 1 directly toward the surface of the medium to be measured. The opening 4 extends through the tank cover 2. The circular cylindrical opening 4 can be an existing inspection window for monitoring the interior of the tank, but also an opening specifically formed for this purpose. To separate the interior of the tank from the environment, the opening 4 is closed with a plate 5 of quartz glass or ceramic material. The material of the quartz glass or ceramic is chosen to have a low dielectric constant, which is favorable to the transmission of microwaves, and as low a loss factor as possible. It is also necessary to select the wall thickness of the quartz glass or ceramic such that reliable separation between process and environment is ensured. The diameter of the window must be at least equal to that of the mouth of the horn antenna 1. In the embodiment described, windows of 25-mm-thick borosilicate glass and openings with a diameter of 150 mm have proved to be effective.

To fix the quartz-glass or ceramic plate 5 to the tank cover 2, a holding ring 6 encloses the quartz-glass or ceramic plate 5.

Fastening screws 7 and tapped holes 8 provide a non-permanent joint by means of which the holding ring 6 is positively fixed to the tank wall 2. Of course, the quartz-glass or ceramic plate 5 or the holding ring 6 may be fixed to the tank cover 2 by any other method familiar to those skilled in the art.

Previous attempts to measure the level of tank contents by means of microwaves failed because, despite the comparatively low dielectric constants of the glasses used, because of the thickness of the glass or ceramic required to provide isolation between process and environment, strong reflections at the top and bottom surfaces of the glass or ceramic plate and only narrow-band thickness resonances occur within the required passband for the short electromagnetic waves. In the case of glass with $\epsilon_r=7$, for example, only approximately 80% of the waves is passed and approximately 20% reflected at each glass-air interface.

Because of the short distance from the glass or ceramic plate to the level measuring assembly, the wave component reflected at the surfaces of the plate reaches the level measuring assembly immediately after transmission via the horn antenna. At the level measuring assembly, it is reflected from the horn antenna and/or the waveguide tube and then again from the surfaces of the glass or ceramic plate. These wave components, which travel to and fro between the level measuring assembly and the surfaces of the glass plates until they have lost all energy, cause an unwanted echo approximately in the form of a ramp, which covers the useful signal and thus renders measurements in the proximity zone of the antenna impossible.

FIG. 2 illustrates this effect. In the chart of FIG. 2a, the abscissa represents the measuring distance in meters, and the ordinate the measured value, also in meters. The curve shows the measurement signal of the microwave level measuring assembly obtained by projecting a signal through the quartz-glass or ceramic plate toward the surface of a material contained in a tank. As can be seen from the graph in FIG. 2a, quite a number of false measurements occur. The unwanted echos in the proximity zone of the antenna—approximately 0.5 meters to approximately 3.5 meters—, which are due to multiple reflections, cause such a high noise level that reliable measurements of the tank-contents level are impossible in this zone.

The invention overcomes this prejudice as it turned out to the inventors' surprise that level measurements by means of short electromagnetic waves through the window of a metallic tank, which is closed with a quartz-glass or ceramic plate, are possible if, according to the invention, a layer 9 formed by a conventional, commercially available damping mat is interposed between the microwave coupling element 18 and the quartz-glass or ceramic plate 5. The interposition of such a damping layer 9 causes both the measurement signal and the reflected signal to be attenuated when passing through the damping layer. This damping, which occurs twice, attenuates the useful signal, but also the unwanted signal which is caused by reflections at the surfaces of the horn antenna 1 and the glass or ceramic plate 5 and travels to and fro. Since this unwanted signal passes through the damping layer several times, it is attenuated to a much greater extent than the useful signal, which passes through the damping layer twice. This results in an appreciable improvement in signal-to-noise ratio. By appropriate choice of the damping coefficient of the damping layer, the signal-to-noise ratio, and thus the level, of the useful signal can be set. The damping mat can be, for example, a mat of ECCOSORB AN as is available from GRACE N.V., Belgium.

In FIG. 2b, the abscissa again represents the measuring distance in meters, and the ordinate the measured value in meters. The curve shows the measurement signal analogously to FIG. 2a with the difference that a damping layer 9 has been interposed between the horn antenna 1 and the glass or ceramic plate 5. It is readily apparent from FIG. 2b that the interposition of the damping layer 9 prevents a high noise level and results in correct measured values throughout. It is, of course, necessary for the microwave level measuring assembly to have a sufficient dynamic-range reserve, so that the useful signal can be evaluated properly despite being damped twice. However, this is no problem, since nearly all microwave level measuring devices available today have such a sufficient dynamic-range reserve.

The interposition of a damping layer has an added advantage in that by appropriate choice of the damping factor, the rate of rise of the unwanted signal, i.e., the signal-to-noise ratio as a function of distance, and thus the absolute level of the useful signal and, consequently, the measuring range, can be set.

FIG. 1 further shows an attachment of the level measuring assembly to the cover 2 of the tank. An annular flange 10 encloses the holding ring 6 coaxially at a constant distance. The annular flange 10 has a number of tapped holes 11. They are arranged equidistantly along a hole circle. The annular flange 10 is permanently joined to the tank cover 2 by welding.

A further welded joint establishes the permanent connection between the horn antenna 1 and a mounting flange 12. The mounting flange 12 extends coaxially around the top edge of the horn antenna 1 and the circumferential surface of the waveguide tube 13. The probe of the microwave coupling element 18 extends through the circumferential surface of the waveguide tube 13 and projects radially into the interior of the waveguide tube 13. The microwave coupling element 18 is connected by a coaxial line to the electronic transmitting and receiving section. Along its circumference, the mounting flange 12 has a number of through holes 14 which are distributed on the mounting flange 12 in the same way as the tapped holes 11 in the annular flange 10. The tapped holes 11 and the through holes 14 are located opposite each other. Between the flanges 10 and 12, threaded pillars 15 are provided. The threaded pillars 15 are supported in the tapped holes 11 of the annular flange 10. The mounting flange 12 is clamped between two nuts 16, 17 on each of the threaded pillars 15. Thus, the level measuring assembly is detachably connected with the tank container 12. This type of mounting makes it possible to precisely set the distance from the level measuring assembly to the tank cover 2, and thus the distance from the edge of the horn antenna 1 to the glass or ceramic plate 5, by simply loosening, readjusting, and then tightening the bolted joint formed by the mounting flange 12 and the nuts 16, 17. Such setting is necessary because by appropriate choice of the distance between the horn antenna 1 and the glass or ceramic plate 5, the signal-to-noise ratio in a spatial zone near the window can be kept particularly high.

It is also possible, of course, to choose any other vertically adjustable mounting of the microwave level measuring assembly that is familiar to those skilled in the art.

FIGS. 3 and 4 illustrate the effect of the invention by graphs of the echo function. In the chart of FIG. 3, the abscissa represents the measuring distance in meters, and the ordinate the signal power in dB. The upper curve a, shows the echo function obtained without the damping layer 9, and the lower curve, b, the echo function obtained with the damping layer 9, at a measuring distance of 1.2 m.

The first maximum represents the transmitted pulse. The maximum at 0 m is the reflection from the surface of the glass or ceramic plate 5. As can be seen, in curve a, the reflection from the surface of the plate 5 without the damping layer 9 is approximately 20 dB stronger than in curve b, which shows the reflection with the damping layer 9 interposed. In the chart of FIG. 3, the useful signal disappears completely in the unwanted signal without the damping layer 9 while being clearly distinguished from the unwanted signal in the presence of the damping layer 9.

The chart of FIG. 4 shows the same echo function for a measuring distance of 2.2 m. It can be seen that without the damping layer 9, the useful signal can still be evaluated, but its signal-to-noise ratio is lower than with the damping layer 9 interposed. The damping renders the unwanted signal considerably smoother.

Despite the reduction of signal power caused by the damping, the echo function can be better evaluated in all cases. In a practical realization, an attenuation of 7 dB was obtained at a transmitted frequency of 5.8 GHz and a damping-layer thickness of approximately 20 mm. A distance between the horn antenna 1 and the glass or ceramic plate 5 of approximately 40 mm has proved to be particularly effective.

It is, of course, advantageous if as few reflecting parts as possible, such as spacers, stay bolts, metallic housing parts, etc., are present between the edge of the horn antenna 1 and the plate 5, so that further reflections of the transmitted waves are avoided.

One should not conceal the fact that compared with a level measurement by means of short electromagnetic waves through the wall of a tank of a suitable material, the level measurement through a glass or ceramic plate of a metallic tank with a damping layer interposed between the horn antenna and the glass or ceramic plate results in a shorter range of measurement. In most applications, however, this can be readily accepted.

I claim:

1. A tank-contents level measuring assembly comprising a horn antenna which transmits short electromagnetic waves through an opening in the tank toward the surface of contents of the tank, which electromagnetic waves are reflected at the surface and received by the same horn antenna, characterized by the following features:

a) The level measuring assembly, including the horn antenna (1), is disposed outside an interior (3) of the tank at a tank wall (2) substantially along an axis of symmetry of the opening (4);

b) the opening (4) is closed with a plate (5);

c) a damping layer (9) is interposed between a microwave coupling element (18) of the level measuring assembly and a surface of the plate (5); and d) the damping layer (9) occupies such a position between the microwave coupling element (18) and the plate (5) that each radiated or reflected electromagnetic wave passing through the damping layer is attenuated.

2. The measuring assembly as claimed in claim 1, wherein the damping layer (9) is formed by a piece of a commercially available damping mat.

3. The assembly as claimed in claim 2, wherein the damping layer (9) is made of ECCOSORB AN as is available from GRACE N.V., Belgium.

4. The assembly as claimed in claim 1, wherein the interior (3) of the tank containing the medium whose level is to be measured is sealed from the environment by the plate (5).

5. The assembly as claimed in claim 4, wherein the plate (5) is enclosed by fixing means (6).

6. The assembly as claimed in claim 5, wherein the fixing means (6) provide a pressure- and explosion-proof connection between the plate (5) and the tank wall (2).

7. The assembly as claimed in claim 4, wherein the plate (5) is made of a material having a low dielectric loss factor for the transmission of electromagnetic waves and a low dielectric constant.

8. The assembly as claimed in claim 7, wherein the plate (5) is made of borosilicate glass.

9. The assembly as claimed in claim 1, wherein a bottom edge of the horn antenna (1) is spaced apart from the surface of the plate (5) by a selected spatial distance so that that signal-to-noise ratio and the signal strength of the electromagnetic waves are adjustable.

10. The assembly as claimed in claim 9, further comprising means (15, 16, 17) for changing and fixing the spatial distance between the bottom edge of the horn antenna (1) and the surface of the plate (5).

11. The assembly as claimed in claim 1, wherein by appropriate choice of the damping coefficient, the signal-to-noise ratio and the absolute level of the useful signal are settable.

12. The assembly as claimed in claim 1, wherein the plate (5) is made from a glass material.

13. The assembly as claimed in claim 1, wherein the plate (5) is made from a ceramic material.

* * * * *